United States Patent
Xu et al.

(10) Patent No.: US 10,241,274 B2
(45) Date of Patent: Mar. 26, 2019

(54) DISPERSION-COMPENSATIVE OPTICAL ASSEMBLY

(71) Applicant: Finisar Corporation, Sunnyvale, CA (US)

(72) Inventors: Xiaojie Xu, Pleasanton, CA (US); Thomas W. Mossberg, Eugene, OR (US); Tengda Du, San Jose, CA (US); Christoph M. Greiner, Eugene, OR (US); Dmitri Iazikov, Eugene, OR (US)

(73) Assignee: FINISAR CORPORATION, Sunnyvale, CA (US)

( * ) Notice: Subject to any disclaimer, the term of this patent is extended or adjusted under 35 U.S.C. 154(b) by 0 days.

(21) Appl. No.: 15/454,585

(22) Filed: Mar. 9, 2017

(65) Prior Publication Data
US 2017/0261694 A1 Sep. 14, 2017

Related U.S. Application Data

(60) Provisional application No. 62/305,873, filed on Mar. 9, 2016.

(51) Int. Cl.
| | |
|---|---|
| *G02B 6/30* | (2006.01) |
| *G02B 6/293* | (2006.01) |
| *G02B 6/34* | (2006.01) |
| *G02B 6/12* | (2006.01) |

(52) U.S. Cl.
CPC .......... *G02B 6/34* (2013.01); *G02B 6/29307* (2013.01); *G02B 6/29308* (2013.01); *G02B 6/30* (2013.01); *G02B 2006/12107* (2013.01)

(58) Field of Classification Search
CPC ... G02B 6/26; G02B 6/30; G02B 6/34; G02B 6/29308; G02B 2006/12107
USPC ...................................................... 385/37, 39
See application file for complete search history.

(56) References Cited

U.S. PATENT DOCUMENTS

| | | | | |
|---|---|---|---|---|
| 5,101,459 | A | * 3/1992 | Sunagawa | ................ G02B 6/34 385/130 |
| 5,363,226 | A | * 11/1994 | Strasser | ............. G02B 6/12007 359/566 |
| 5,420,947 | A | * 5/1995 | Li | ............................ G02B 6/34 359/569 |

(Continued)

OTHER PUBLICATIONS

"Achromatic waveguide couplers" by Spaulding et al, Journal of Lightwave Technology, vol. 10, No. 10, pp. 1513-1518, 1992.*

(Continued)

*Primary Examiner* — Robert Tavlykaev
(74) *Attorney, Agent, or Firm* — Maschoff Brennan

(57) ABSTRACT

An optical assembly includes a first grating device configured to: receive a light beam that includes an optical signal with a particular wavelength from a fiber; and change a propagation direction of the optical signal according to the particular wavelength of the optical signal. The optical assembly also includes a second grating device configured to: receive the optical signal outputted from the first grating device; change the propagation direction of the optical signal according to the particular wavelength of the optical signal; and direct the optical signal onto a grating coupler. The first grating device and the second grating device are configured to satisfy a plurality of configuration constraints.

19 Claims, 5 Drawing Sheets

(56) References Cited

U.S. PATENT DOCUMENTS

2016/0363728 A1* 12/2016 Wang .................. G02B 6/34

OTHER PUBLICATIONS

"Analytic design of an achromatic double grating coupler" by Amitai et al, Applied Optics, vol. 30, No. 21, pp. 2970-2974, 1991.*
"Achromatic waveguide input/output coupler design" by Spaulding et al, Applied Optics, vol. 30, No. 9, pp. 1098-1112, 1991.*

* cited by examiner

DISPERSION-COMPENSATIVE OPTICAL ASSEMBLY

CROSS-REFERENCE TO RELATED APPLICATIONS

This application claims the benefit of and priority to U.S. Provisional App. No. 62/305,873, filed Mar. 9, 2016. The foregoing provisional application is incorporated herein by reference.

FIELD

Some embodiments described herein generally relate to an optical assembly configured to compensate angular dispersion of a grating coupler.

BACKGROUND

Unless otherwise indicated herein, the materials described herein are not prior art to the claims in the present application and are not admitted to be prior art by inclusion in this section.

A challenge for optics communications may include coupling a light beam from a fiber (e.g., a single mode fiber (SMF)) into a silicon photonics chip (or other integrated waveguide device) or vice versa. A mode diameter size for a waveguide on the silicon photonics chip may be about a micrometer ($\mu m$) or less than 1 $\mu m$, while a mode diameter size for an SMF fiber may be about 10 $\mu m$, resulting in a mismatch between the waveguide and the SMF fiber. Loss may be incurred if a light beam is coupled directly from the SMF fiber into the waveguide on the silicon photonics chip or vice versa.

A grating coupler may be used to aid in the light beam coupling between the SMF fiber and the waveguide. For example, the grating coupler may include a grating at an end of the waveguide, so that a light beam that propagates through the waveguide may be diffracted out of the waveguide from the grating coupler and may then be coupled into the SMF fiber. In another example, the grating coupler may allow beam spot conversion from a mode diameter size with a range of 300 nanometers (nm) to 500 nm (or another suitable range) in a confined silicon (Si) waveguide to a mode diameter size of about 10 $\mu m$ (or another suitable value) in a SMF fiber. The grating coupler may also allow on chip testing, which is beneficial to mass production of silicon photonics wafers and other integrated waveguide devices.

However, the grating coupler may have a limited coupling bandwidth. For example, a lens may be placed between the fiber and the grating coupler to focus a light beam from the fiber to the grating coupler. However, the light beam outputted from the lens may have a fixed input direction to the grating coupler. The fixed input direction may lead to an acceptable coupling efficiency for a particular wavelength on the grating coupler, which may pass the light beam to a waveguide on a silicon photonics chip. However, the grating coupler is sensitive to the wavelength of the light beam. If the wavelength of the light beam changes, the fixed input direction of the light beam from the lens to the grating coupler may cause the grating coupler to send the light beam to a wrong direction and therefore the light beam may totally or partially miss the waveguide, resulting in a low coupling efficiency of the grating coupler.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF SOME EXAMPLE EMBODIMENTS

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Some example embodiments described herein generally relate to an optical assembly configured to compensate angular dispersion of a grating coupler on a silicon photonics device or other planar waveguide device.

In an example embodiment, an optical assembly includes a first grating device and a second grating device, each configured to provide dispersion. The optical assembly additionally includes a device to provide focusing. The first and second grating devices and the device to provide focusing are positioned in an optical path between an optical fiber and a grating coupler of a planar waveguide device.

In another example embodiment, an optical assembly may include a first grating device configured to: receive a light beam that includes an optical signal with a particular wavelength from a fiber; and change a propagation direction of the optical signal according to the particular wavelength of the optical signal. The optical assembly may also include a second grating device configured to: receive the optical signal outputted from the first grating device; change the propagation direction of the optical signal according to the particular wavelength of the optical signal; and direct the optical signal onto a grating coupler. The first grating device and the second grating device may be configured to satisfy a plurality of configuration constraints that may include: a relative displacement of the first grating device and the second grating device may enable the second grating device to direct the optical signal onto the grating coupler; and after propagating through the second grating device, the optical signal may be inputted to the grating coupler with an input angle that may match an optimal incidence angle configured for the particular wavelength on the grating coupler.

In another example embodiment, an optical assembly may include a first grating device configured to: receive a light beam that includes optical signals with different wavelengths from a fiber; and change propagation directions of the optical signals according to the respective wavelengths of the optical signals. The optical assembly may include a second grating device configured to: receive the optical signals outputted from the first grating device; change the propagation directions of the optical signals according to the respective wavelengths of the optical signals; and direct the optical signals onto a grating coupler. The first grating device and the second grating device may be configured to satisfy a plurality of configuration constraints that may include: a relative displacement of the first grating device and the second grating device may enable the second grating device to direct the optical signals with the different wavelengths onto the grating coupler; and after propagating through the second grating device, the optical signals may converge and be incident on the grating coupler with different input angles that respectively match optimal incidence angles configured for the different wavelengths on the grating coupler.

Additional features and advantages of the disclosure will be set forth in the description which follows, and in part will be obvious from the description, or may be learned by the practice of the disclosure. The features and advantages of the disclosure may be realized and obtained by means of the instruments and combinations particularly pointed out in the appended claims. These and other features of the present disclosure will become more fully apparent from the following description and appended claims, or may be learned by the practice of the disclosure as set forth hereinafter.

BRIEF DESCRIPTION OF THE DRAWINGS

To further clarify the above and other advantages and features of the present disclosure, a more particular description of the disclosure will be rendered by reference to specific embodiments thereof which are illustrated in the appended drawings. It is appreciated that these drawings depict only typical embodiments of the disclosure and are therefore not to be considered limiting of its scope. The disclosure will be described and explained with additional specificity and detail through the use of the accompanying drawings in which.

all arranged in accordance with at least one embodiment described herein.

DETAILED DESCRIPTION OF SOME EXAMPLE EMBODIMENTS

Embodiments described herein generally relate to an optical assembly configured to compensate angular dispersion of a grating coupler on a silicon photonics device or other planar waveguide device.

Some embodiments described herein may include a dispersion compensative optical assembly configured to increase a coupling bandwidth of a grating coupler on a silicon photonics device or other planar waveguide device. The optical assembly may include a first grating device and a second grating device. The optical assembly may use dispersion properties of the first grating device and the second grating device to compensate angular dispersion of the grating coupler so that a coupling bandwidth between the grating coupler and a fiber may be increased. A combined configuration of the first grating device and the second grating device may be applied to adjust one or more input angles of one or more optical signals that may converge and hit the grating coupler, so that even though wavelengths of the one or more optical signals are different or vary, the grating coupler may still be able to couple each of the one or more optical signals to or from a waveguide within the silicon photonics device or other planar waveguide device with a high coupling efficiency.

As used herein, a high coupling efficiency may refer to a coupling efficiency that is no less than a predetermined threshold. For example, a high coupling efficiency may refer to an efficiency that is no less than 30%, 50%, 60%, or another suitable efficiency number.

Technologies described herein may be applicable in high-speed fiber optics transceivers, silicon photonics devices, diffractive grating devices with high efficiency, and other suitable products.

Reference will now be made to the drawings to describe various aspects of some example embodiments of the disclosure. The drawings are diagrammatic and schematic representations of such example embodiments, and are not limiting of the present disclosure, nor are they necessarily drawn to scale.

Figure 1:
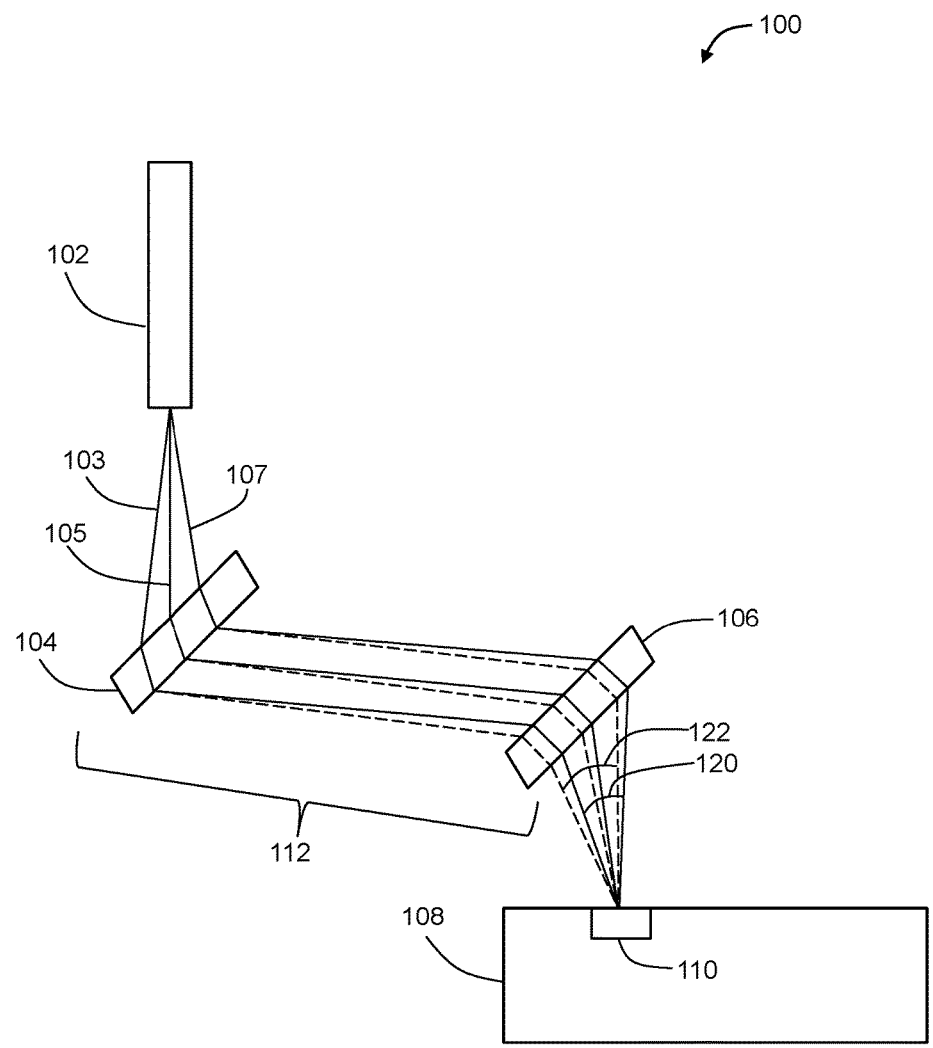
FIG. 1 is a block diagram of an example system configured to couple a light beam between a fiber and a silicon photonics chip (or other planar waveguide device)

FIG. 1 is a block diagram of an example system 100 configured to couple a light beam between a fiber 102 and a silicon photonics chip 108, arranged in accordance with at least one embodiment described herein. The system 100 may include the fiber 102, the silicon photonics chip 108, an optical assembly 112 between the fiber 102 and the silicon photonics chip 108, and other suitable components. In other embodiments, the system 100 may include some other planar waveguide device in place of the silicon photonics chip 108.

The fiber 102 may include an optical fiber (e.g., an SMF fiber or another suitable type of optical fiber). The silicon photonics chip 108 may include a grating coupler 110, a waveguide (not shown in FIG. 1) optically coupled to the grating coupler 110, and/or other suitable components for a silicon photonics device.

The grating coupler 110 may be configured to receive an optical signal inputted to the silicon photonics chip 108 and pass the optical signal to the waveguide inside the silicon photonics chip 108. For different optical signals with different wavelengths, each optical signal may need to be inputted to the grating coupler 110 with a different input angle so that the grating coupler 110 may couple the corresponding optical signal to the waveguide with a high coupling efficiency. The optical assembly 112 described herein may enable different optical signals from the fiber 102 to be inputted to the grating coupler 110 with different appropriate input angles.

Alternatively, the grating coupler 110 may be configured to receive an optical signal from the waveguide inside the silicon photonics chip 108 and output the optical signal to a device external to the silicon photonics chip 108. For different optical signals with different wavelengths, the grating coupler 110 may output each optical signal with a different output angle. The optical assembly 112 described herein may enable different optical signals with different output angles from the grating coupler 110 to be focused into the fiber 102.

In some embodiments, the optical assembly 112 may be configured to couple a light beam outputted from the fiber 102 into the grating coupler 110 of the silicon photonics chip 108, so that the grating coupler 110 may pass the light beam to a waveguide of the silicon photonics chip 108 with a high coupling efficiency. Alternatively, the optical assembly 112 may be configured to couple a light beam outputted from the grating coupler 110 into the fiber 102 so that the grating coupler 110 may pass the light beam from the waveguide of the silicon photonics chip 108 to the fiber 102 with a high coupling efficiency. Since optical paths through the fiber 102, the optical assembly 112, and the grating coupler 110 are reciprocal, without loss of generality the following description with reference to FIG. 1 is mainly provided with reference to a light beam that propagates from the fiber 102 to the silicon photonics chip 108. However, with the same or similar configuration, the fiber 102, the optical assembly 112, and the grating coupler 110 described herein may also be used to couple a light beam from the silicon photonics chip 108 to the fiber 102.

The optical assembly 112 may include a first grating device 104, a second grating device 106, and/or other suitable optical components. The first grating device 104 may be configured to receive a light beam from the fiber 102. The light beam may include one or more optical signals, with each optical signal associated with a different wavelength. The light beam may have a cone shape after exiting the fiber 102 in some embodiments. FIG. 1 illustrates a beam profile of the light beam, where line 105 may represent or correspond to a center of the light beam, and lines 103 and 107 may represent boundaries of the light beam.

The first grating device 104 may change one or more corresponding propagation directions of the one or more optical signals according to one or more respective wavelengths of the one or more optical signals. For example, the first grating device 104 may cause angular dispersion on the one or more optical signals that propagate through, resulting in propagation direction changes on the one or more optical signals according to their respective wavelengths. For illustration purpose only, FIG. 1 shows a light beam that includes a first optical signal and a second optical signal. The first optical signal passes through the first grating device 104 and propagates in a first direction, as illustrated by three solid lines between the first grating device 104 and the second grating device 106. The second optical signal passes through the first grating device 104 and then propagates in a second direction, as illustrated by three dashed lines between the first grating device 104 and the second grating device 106. The first optical signal may have a wavelength greater than the second optical signal.

In some embodiments, the first grating device 104 may include a normal or standard grating with straight lines and equal line spacings. Alternatively, the first grating device 104 may include a grating lens (e.g., a diffractive grating lens) or another suitable type of grating device.

The second grating device 106 may be configured to receive the one or more optical signals that propagate through the first grating device 104. The second grating device 106 may change the one or more corresponding propagation directions of the one or more optical signals according to the one or more respective wavelengths of the one or more optical signals. For example, the second grating device 106 may cause angular dispersion on the one or more optical signals that propagate through, resulting in propagation direction changes on the one or more optical signals according to their respective wavelengths. The second grating device 106 may also be configured to focus the one or more optical signals onto the grating coupler 110. For example, the second grating device 106 may focus the one or more optical signals such that the grating coupler 110 may locate at a focal point of the one or more optical signals.

In some embodiments, the second grating device 106 may include a grating with curved lines and unequal line spacings. The curved lines and unequal line spacings of the second grating device 106 may be configured to act as a grating lens (e.g., a diffractive grating lens) or another suitable type of grating devices. Some example relevant designs for the second grating device 106 are found in: U.S. Pat. No. 8,165,436, titled "Highly Efficient Optical Gratings with Reduced Thickness Requirements and Impedance-Matching Layers," issued on Apr. 24, 2012; U.S. Pat. No. 8,068,709, titled "Transmission Gratings Designed by Computed Interference between Simulated Optical Signals and Fabricated by Reduction Lithography," issued on Nov. 29, 2011; U.S. Pat. No. 7,840,106, titled "Etched Surface Gratings Fabricated Using Computed Interference between Simulated Optical Signals and Reduction Lithography," issued on Nov. 23, 2010; U.S. Pat. No. 7,519,248, titled "Transmission Gratings Designed by Computed Interference between Simulated Optical Signals and Fabricated by Reduction Lithography," issued on Apr. 14, 2009; and U.S. Pat. No. 7,349,599, titled "Etched Surface Gratings Fabricated Using Computed Interference between Simulated Optical Signals and Reduction Lithography," issued on Mar. 25, 2008. The foregoing patents are incorporated herein by reference.

For a light beam with one or more optical signals to be coupled from the fiber 102 to the grating coupler 110, the first grating device 104 may change one or more beam profiles of the one or more optical signals from cone-like beam profiles to cylinder-like beam profiles. The second grating device 104 may change the one or more beam profiles of the one or more optical signals from the cylinder-like beam profiles back to cone-like beam profiles. The gratings 104 and 106 may be configured generally to image the fiber face onto the grating coupler.

In some embodiments, the first grating device 104 and the second grating device 106 may be configured together to satisfy one or more configuration constraints. A first configuration constraint may require that a relative displacement of the first grating device 104 and the second grating device 106 enable the second grating device 106 to focus, or at least direct, the one or more optical signals onto the grating coupler 110. For example, the first grating device 104 and the second grating device 106 may be placed relative to each other in a manner such that the optical signals outputted from the second grating device 106 converge on the grating coupler 110.

In general, an optical signal associated with a particular wavelength may need to be directed onto the grating coupler 110 with an appropriate input angle so that the grating coupler 110 may achieve a high coupling efficiency for that particular wavelength. Different wavelengths may be associated with different appropriate input angles. Thus, a second configuration constraint may require that, after propagating through the second grating device 106, the one or more optical signals may be inputted to the grating coupler 110 with one or more input angles, where the one or more input angles may match one or more optimal incidence angles configured for the respective wavelengths on the grating coupler 110. An optimal incidence angle associated with a wavelength may be an input angle configured for the wavelength to achieve a high coupling efficiency on the grating coupler 110. The optimal incidence angle associated with each wavelength may include any incidence angle within a range of incidence angles that are suitable to achieve a coupling efficiency that is equal to or greater than the predetermined threshold that defines high coupling efficiency.

For example, the first grating device 104 and the second grating device 106 may be configured to enable a first optical signal associated with a first wavelength to converge and be incident on the grating coupler 110 with a first input angle that matches a first optimal incidence angle associated with the first wavelength (e.g., the first input angle may be similar or identical to the first optimum incidence angle). Simultaneously, the first grating device 104 and the second grating device 106 may also be configured to enable a second optical signal associated with a second wavelength to converge and be incident on the grating coupler 110 with a second input angle that matches a second optimal incidence angle associated with the second wavelength (e.g., the second input angle may be similar or identical to the second optimal incidence angle, where the second optimal incidence angle is different than the first optimal incidence angle). Thus, the first grating device 104 and the second grating device 106 may be configured to map optical signals associated with different wavelengths to appropriate input angles that respectively match corresponding optimal incidence angles of the wavelengths.

Generally, the first grating device 104 may cause a wavelength-dependent angular deviation on an optical signal that propagates through the first grating device 104. The wavelength-dependent angular deviation so introduced on the optical signal may cause optical signals of different wavelengths to be incident on the second grating device 106 at different physical locations (which may at least partially overlap) and at different incidence angles. Thus, the first grating device 104 and the second grating device 106 can be configured properly so that the optical signals outputted from the second grating device 106 may converge and be incident on the grating coupler 110 with an appropriate wavelength-dependent input angle that matches an optimal wavelength-dependent incidence angle.

A third configuration constraint may require that a band of converging angles of each optical signal fall within a numerical aperture of the grating coupler 110. The numerical aperture of the grating coupler 110 may characterize a range of angles over which the grating coupler 110 may accept or emit light. For example, FIG. 1 illustrates a first optical signal that converges on the grating coupler 110, with a beam profile illustrated by three solid lines between the second grating device 106 and the grating coupler 110. The first optical signal may include a band of converging angles 120 that falls within a numerical aperture of the grating coupler 110. FIG. 1 also illustrates a second optical signal that converges on the grating coupler 110, with a beam profile illustrated by three dashed lines between the second grating device 106 and the grating coupler 110. The second optical signal may include a band of converging angles 122 that falls within the numerical aperture of the grating coupler 110.

A fourth configuration constraint may require that a spot size of each optical signal converges on the grating coupler 110 to be within an acceptance spot size of the grating coupler 110. Other configuration constraints for the first grating device 104 and the second grating device 106 are possible.

Figure 3A:
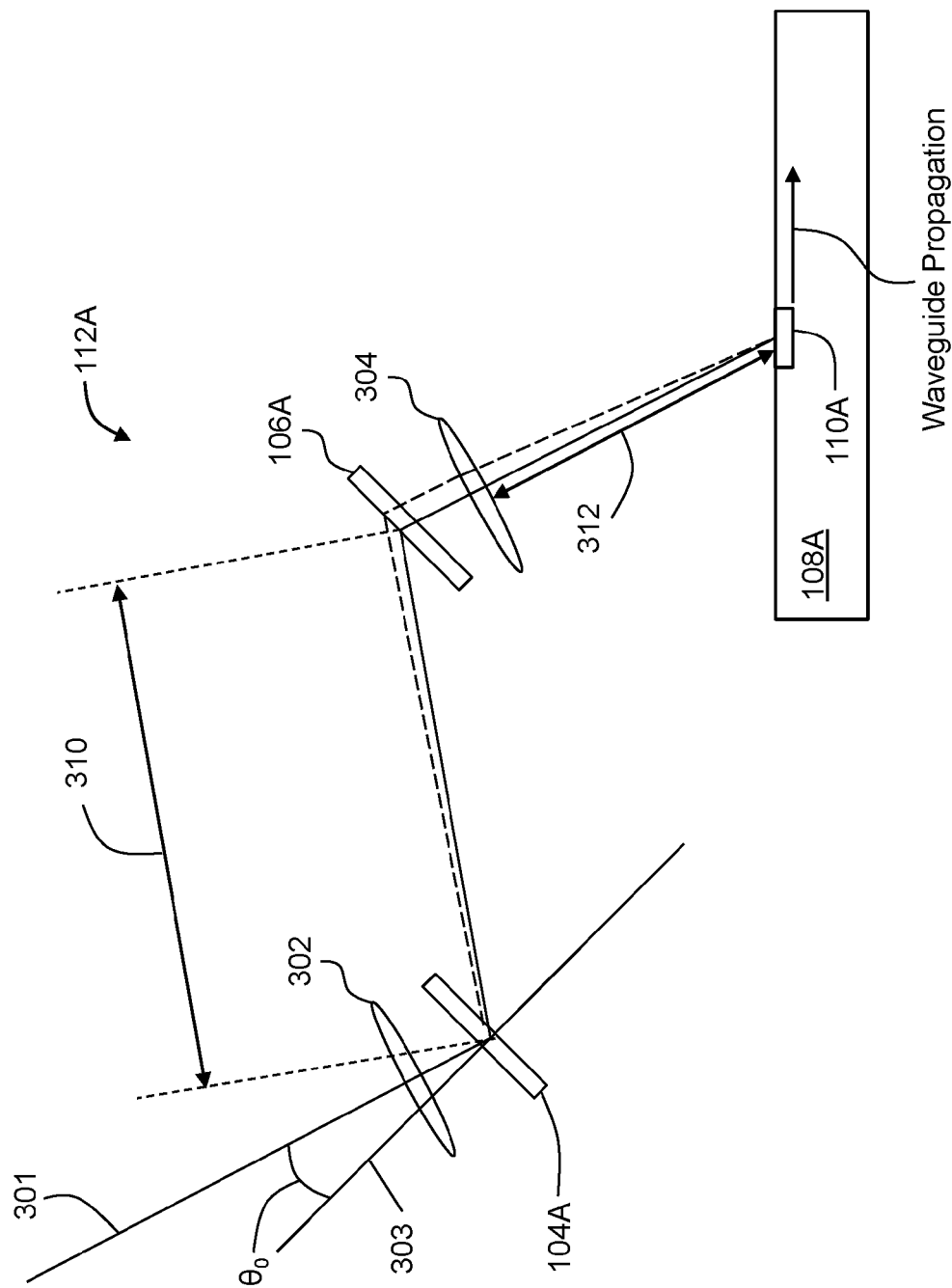
FIGS. 3A-3C illustrate various example configurations of example embodiments of a first grating device, a second grating device, and the silicon photonics chip (or other suitable planar waveguide device) of FIG. 1.
Figure 3B:
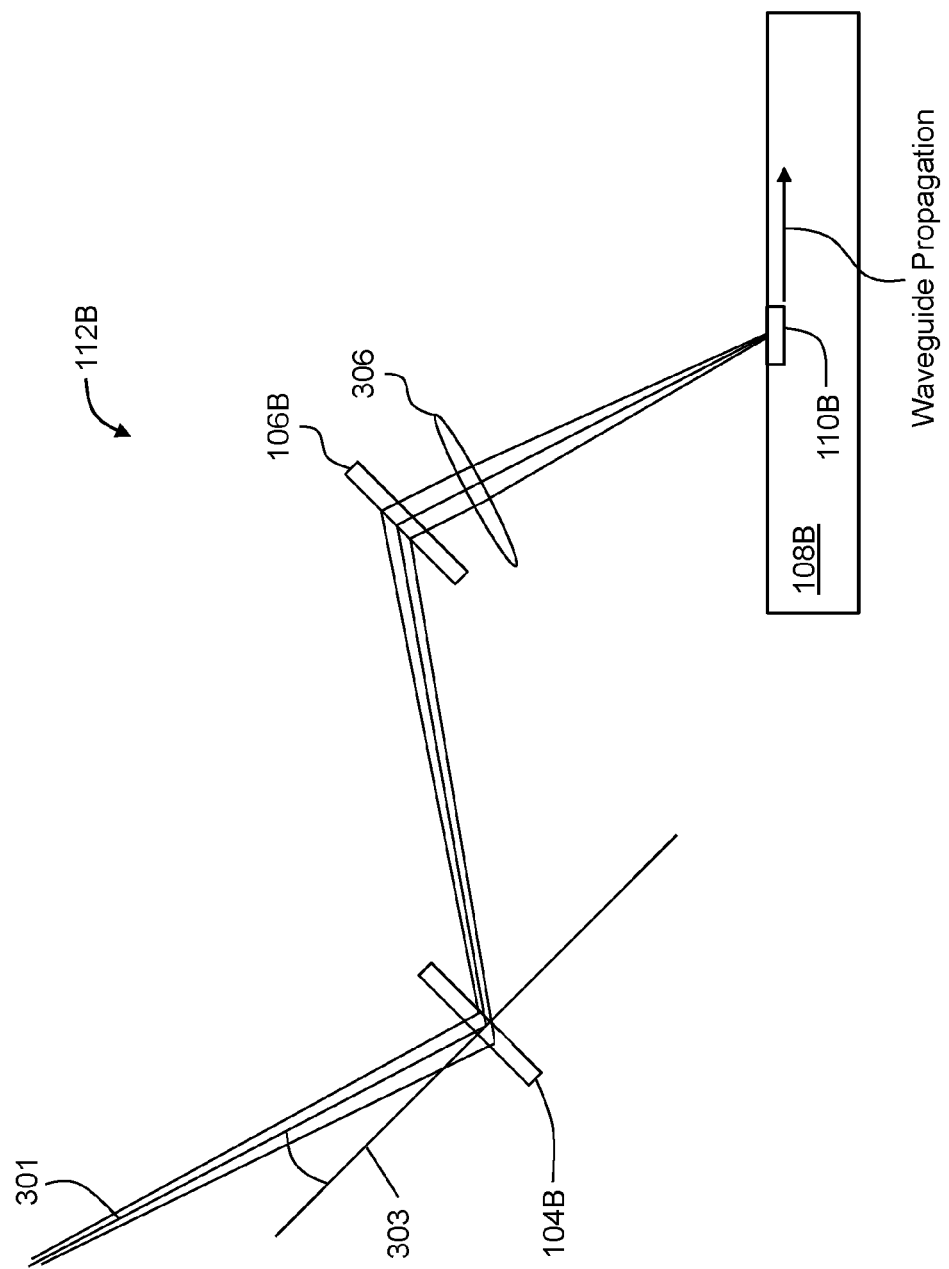
Figure 3C:
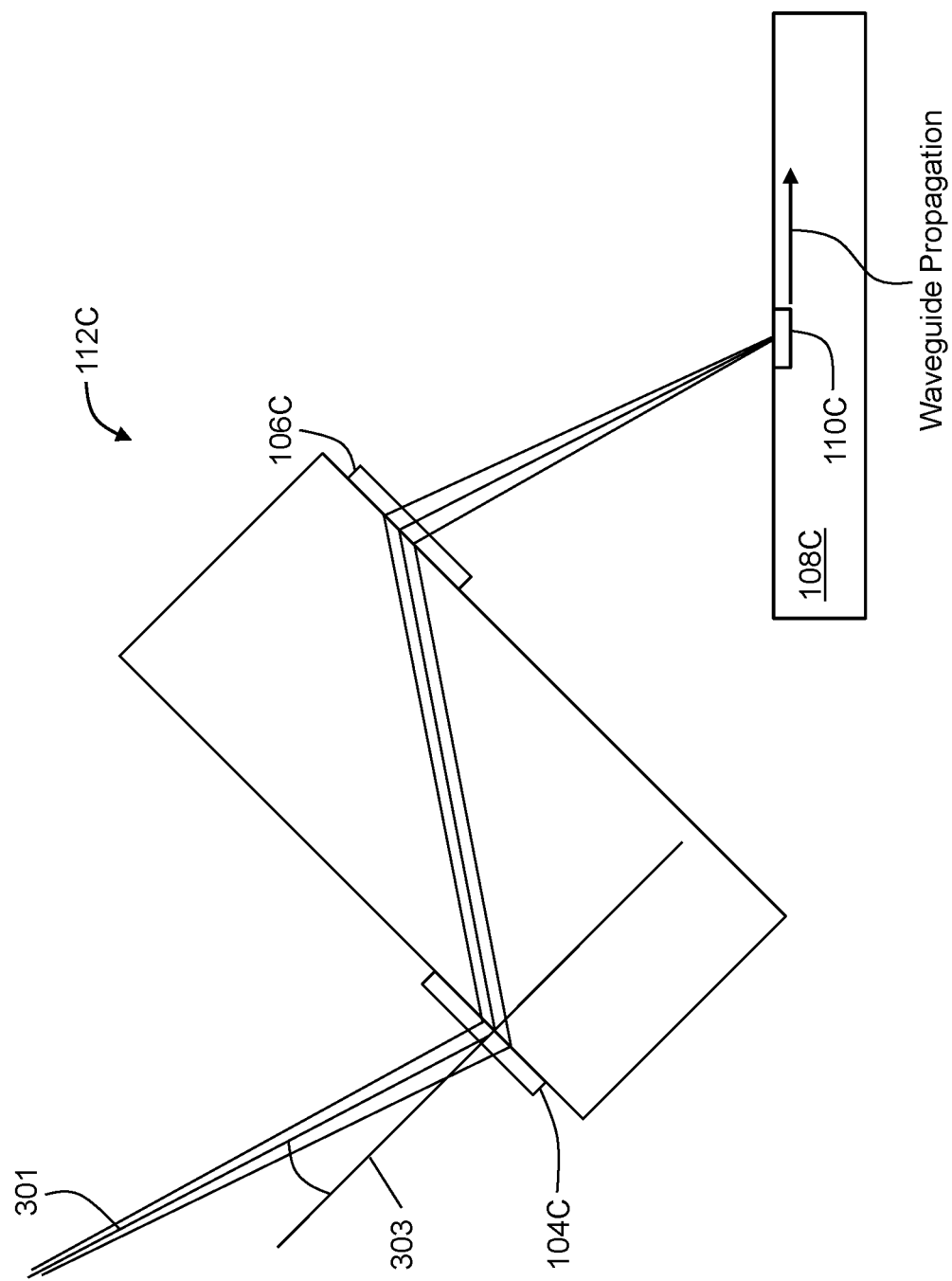

Various example configurations involving example embodiments of the first grating device 104, the second grating device 106, and the silicon photonics chip 108 (or other suitable planar waveguide device) of FIG. 1 are illustrated in FIGS. 3A-3C, which are described in more detail below.

In some embodiments, the optical assembly 112 may include two grating devices and one or more lenses. The two grating devices may include equally spaced straight line gratings and the lens may include a glass lens or a plastic lens. The two grating devices and the one or more lenses may be configured to perform the same or similar functionality as the first grating device 104 and the second grating device 106. For example, a light beam from the fiber 102 may propagate through the two grating devices and then pass through the lens to focus on the grating coupler 110. A combination of the two grating devices and one lens may be configured to satisfy the configuration constraints described herein as illustrated in FIG. 3B. Alternatively, a combination of two lenses and two gratings may be configured as illustrated in FIG. 3A.

In some embodiments, the optical assembly 112 may include a mode transformation component configured to perform a mode transformation for a light beam (or optical signals) that couples between the fiber 102 and the grating coupler 110. For example, the first grating device 104 and/or the second grating device 106 may be configured to include a partial etch phase (PEP) lens component or a specially designed mirror surface shape configured to perform mode transformation. A light beam outputted from the fiber 102 may include a Gaussian mode, and the PEP lens component or the mirror surface shape may convert the Gaussian mode to a suitable mode (e.g., an exponential mode) that may match better to the grating coupler 110 than the Gaussian mode.

In the above description, the optical assembly 112 that includes the first grating device 104 and the second grating device 106 is described with reference to coupling a light beam from the fiber 102 into the grating coupler 110. Due to a reciprocal property of the optical assembly 112, the same or similar optical assembly 112 may also be used to couple a light beam from the grating coupler 110 to the fiber 102. For example, a light beam that includes optical signals with different wavelengths may be outputted from the grating coupler 110, with each optical signal emitting from the grating coupler 110 at a different output angle according to the corresponding wavelength. The second grating device 106 may collimate the optical signals outputted with different output angles from the grating coupler 110, so that the optical signals may change their beam profiles from cone-like beam profiles to cylinder-like beam profiles. The first grating device 106 may then change the optical signals from the cylinder-like beam profiles back to cone-like beam profiles and refocus the optical signals into the fiber 102.

Figure 2:
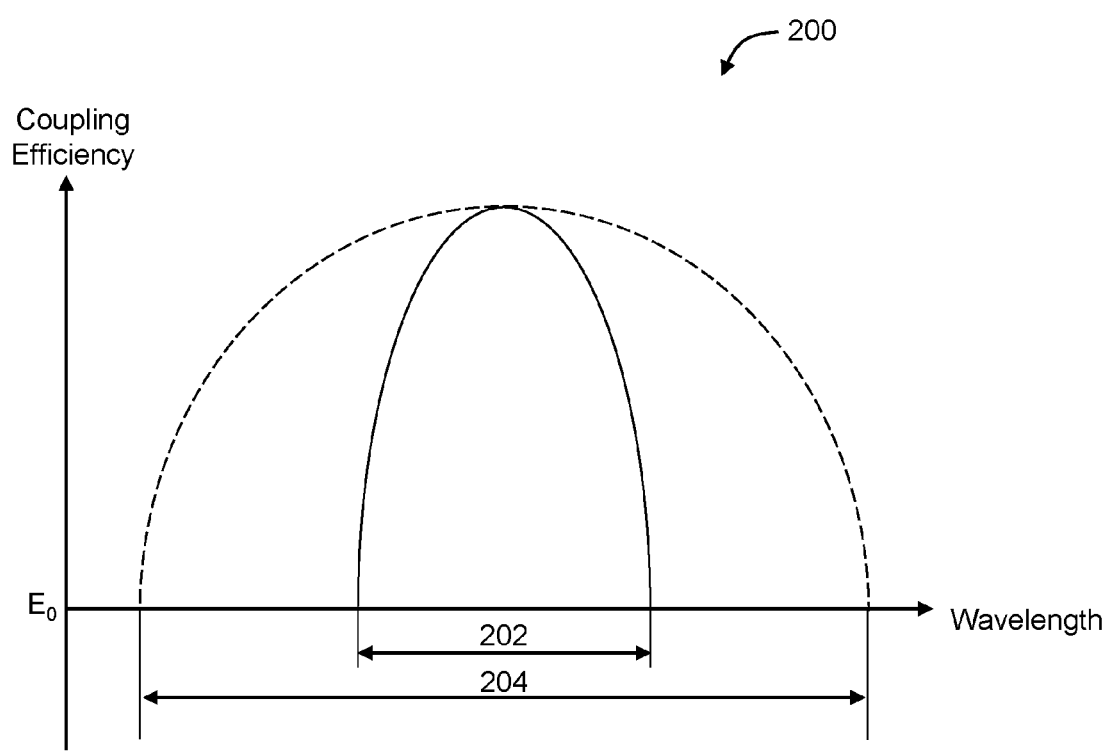
FIG. 2 is a graphical representation of example coupling efficiencies of a grating coupler versus wavelengths.

FIG. 2 is a graphical representation 200 of example coupling efficiencies of a grating coupler versus wavelengths, arranged in accordance with at least one embodiment described herein. The grating coupler of FIG. 2 may be similar or identical to the grating coupler 110 of FIG. 1. A coupling bandwidth 204 illustrates a bandwidth of the grating coupler when combined with an implementation of an optical assembly such as the optical assembly 112 of FIG. 1. A coupling bandwidth 202 illustrates a bandwidth of the grating coupler without implementation of such an optical assembly. A comparison between the coupling bandwidths 202 and 204 shows that a coupling bandwidth of the grating coupler can be increased with implementation of such an optical assembly.

FIGS. 3A-3C illustrate various example configurations of example embodiments of the first grating device 104, the second grating device 106, and the silicon photonics chip 108 (or other suitable planar waveguide device) of FIG. 1, each arranged in accordance with at least one embodiment described herein. For example, FIG. 3A includes a specification of one example configuration of an optical assembly 112A that includes first and second grating devices 104A and 106A with respect to a silicon photonics chip 108A that includes a grating coupler 110A. Each of the optical assembly 112A, the first and second grating devices 104A and 106A, the silicon photonics chip 108A, and the grating coupler 110A may respectively include or correspond to the optical assembly 112, the first and second grating devices 104 and 106, the silicon photonics chip 108, and the grating coupler 110 of FIG. 1.

Each of the first and second grating devices 104A and 106A may include a grating with straight lines and/or equal line spacings. In addition to the first and second grating devices 104A and 106A, the optical assembly 112A of FIG. 3A may include two lenses 302 and 304. The lens 302 may collimate a light beam 301 from, for example, a fiber (e.g., the fiber 102 of FIG. 1). The light beam 301 may include multiple different spectral components which may generally propagate collimated through the first and second grating devices 104A and 104B and may be focused onto the grating coupler 110A by the lens 304. The lens 302 has a focal length $F_1$ and the lens 304 has a focal length $F_2$. In the example of FIG. 3A, $F_1=F_2=1000$ μm. In other embodiments, $F_1$ and $F_2$ may be different from each other and/or may have values other than 1000 μm.

In the example of FIG. 3A, the first and second grating devices 104A, 106A have both lines and surface normal parallel and have the same number of lines/mm. Alternative implementations may employ unequal line counts and non-parallel grating normals provided care is exercised to play off difference in line count with relative angle between grating normals so that different wavelength beams converge on the waveguide coupled with angles matched to optimum spectral input angles. Between the first and second grating devices 104A, 106A, different wavelength components of the light beam 301 experience displacement. Between the second grating device 106A and the lens 304, under conditions specified, all spectral components propagate parallel but different spectral components are laterally displaced (e.g., "laterally" may refer to a direction normal to propagation direction). The lens 304 focuses all parallel input rays to the same spot on the waveguide coupler (e.g., the grating coupler 110A) but with different angles of incidence to match optimal wavelength dependent coupler input angles as is shown. The solid and dashed lines in FIG. 3A between the first grating device 104A and the grating coupler 110A represent central rays of two different wavelength beams or spectral components, one having a nominal wavelength of 1.53 μm (solid line) and the other having a nominal wavelength of 1.565 μm (dashed line) in an example embodiment. In other embodiments, each of the spectral components may have different nominal wavelengths. Each beam has a width but rays other than central rays are omitted from FIG. 3A for clarity. Many different configurations involving different intra grating spacings and grating line counts are possible and may be utilized to optimize overall product configuration.

FIG. 3A additionally illustrates example distances 310, 312 and an example incidence angle $\theta_0$. The incidence angle $\theta_0$ refers to the angle of incidence between the light beam 301 (and more particularly its central ray) and a normal 303 to the first grating device 104A. The incidence angle $\theta_0$ may be 30 degrees in an example embodiment. In other embodiments, the incidence angle $\theta_0$ may be greater than or less than 30 degrees.

The distance 310 refers to a distance or spacing between the first and second grating devices 104A, 106A. The distance 310 may be 770 μm in an example embodiment. In other embodiments, the distance 310 may be greater than or less than 770 μm.

The distance 312 refers to a distance or spacing between the lens 304 and the grating coupler 110A. In this and some other embodiments, the distance 312 may be equal to the focal length $F_2$ of the lens 304. In an example embodiment, the distance 312 may be 1000 μm. In other embodiments, the distance 310 may be greater or less than 1000 μm.

FIG. 3B includes another example configuration of an optical assembly 112B that includes first and second grating devices 104B and 106B with respect to a silicon photonics chip 108B that includes a grating coupler 110B. Each of the optical assembly 112B, the first and second grating devices 104B and 106B, the silicon photonics chip 108B, and the grating coupler 110B may respectively include or correspond to the optical assembly 112, the first and second grating devices 104 and 106, the silicon photonics chip 108, and the grating coupler 110 of FIG. 1. In FIG. 3B, the optical assembly 112B includes, in addition to the first and second grating devices 104B and 106B, a lens 306.

In FIG. 3B, the first and second grating devices 104B and 106B include parallel gratings (both grating lines and grating normals), which together with the lens 306 are configured to accomplish a function similar to that described with respect to FIG. 3A. Between the first and second grating devices 104B and 106B, a single illustrated single wavelength beam is not collimated (contrast to FIG. 3A). Diverging beams propagate through both the first and second grating devices 104B and 106B with different wavelength beams traveling in different directions between the gratings. Central rays of different wavelength beams may be parallel (under given grating configuration) after the second grating device 106B. Individual beams continue to diverge until being focused onto the grating coupler 110B by the single lens 306. In some embodiments, with the first and second grating devices 104B and 106B implemented as parallel gratings with equal line counts (as described in FIG. 3B), input central rays of each distinct wavelength beam before the first grating device 104B may be parallel to central rays of each distinct wavelength beam emergent from the second grating device 106B. This condition is not true generally especially when grating line counts differ or gratings are not parallel.

FIG. 3C includes another example configuration of an optical assembly 112C that includes first and second grating devices 104C and 106C with respect to a silicon photonics chip 108C that includes a grating coupler 110C. Each of the optical assembly 112C, the first and second grating devices 104C and 106C, the silicon photonics chip 108C, and the grating coupler 110C may respectively include or correspond to the optical assembly 112, the first and second grating devices 104 and 106, the silicon photonics chip 108, and the grating coupler 110 of FIG. 1. In FIG. 3C, the optical assembly 112C includes, in addition to the first and second grating devices 104C and 106C, an optical block 308. The configuration of FIG. 3C may be a commercially desirable solution, as described in more detail below.

In FIG. 3C, the optical block 308, which may be implemented as a single block of transparent material such as glass or plastic, may be equipped with the first and second grating devices 104C and 106C implemented as a focusing and dispersing input and output grating. The first and second grating devices 104C and 106C may be parallel and of the same dispersive power. The first and second grating devices 104C and 106C may be molded into the surface of the optical block 308 or impressed onto a layer of pliable material (epoxy, thermoplastic, etc) or they may be created onto separated transparent sheet material of suitable size and thickness and affixed to the optical block 308. Alternatively, the optical block 308 may include two sections of transparent wafer affixed together, where the first and second grating devices 104C and 106C are lithographically scribed on the wafers prior to joining to form the optical block 308 as a single dual grating block by back to back bonding.

Gratings to be used as first and/or second grating devices 104C and/or 106C may be produced hundreds or thousands at a time on transparent wafers. Two wafers scribed or imprinted with such gratings may be bonded together via their back blank sides leaving the requisite two external gratings for use to expand the operational spectral range of waveguide couplers. Examples of waveguide couplers include the grating couplers 110, 110A, 110B, and 110C described herein. After wafers are bonded, they may be diced so as to produce hundreds or thousands of millimeter (mm)-scale devices that include a transparent block (e.g., the optical block 308) and with external gratings (e.g., the first and second grating devices 104C and 106C) to provide the function generally illustrated in FIG. 3C. Wafers are conveniently found with thicknesses on the order of 675 µm which when bonded back to back may provide devices such as the optical block 308 of FIG. 3C with thickness of about 1.35 mm. Different wafer thickness can be employed as desired. Properly designed gratings may be covered with additional layers of transparent material which may conveniently provide for attachment to the waveguide device (e.g., any of the silicon photonics chips 108, 108A, 108B, or 108C described herein or other suitable planar waveguide device) or to the input/output fiber (e.g., the fiber 102 of FIG. 1). More generally, the optical assembly 112C including the first and second grating devices 104C and 106C and the optical block 308 may be formed in any suitable manner.

The lines in FIG. 3C that intersect the first and second grating devices 104C and 106C and the grating coupler 110C represent a single spectral beam. Different spectral components may be collimated inside the transparent material of the optical block 308 after the first grating device 104C but may be angularly separated by the first grating device 104C to arrive at the second grating device 106C spatially separated. The second grating device 106C may converge all spectral components onto the grating coupler 110C but with different input directions set to provide maximal coupling.

The present disclosure is not to be limited in terms of the particular embodiments described herein, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that the present disclosure is not limited to particular methods, reagents, compounds, compositions, or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. An optical assembly comprising:
   a first grating device including a compensating grating with straight lines and equal line spacings;
   a second grating device including a focusing grating with curved lines and unequal line spacings, wherein the first grating device and the second grating device is each configured to provide dispersion; and
   a device to provide focusing wherein the first grating device is positioned between a fiber and the second grating device and wherein the device to provide focusing is positioned between the second grating device and a grating coupler located on a planar waveguide device.

2. The optical assembly of claim 1, wherein the first and second grating devices are parallel and have the same dispersive properties.

3. The optical assembly of claim 2, wherein the first grating device has parallel straight lines with equal areal density.

4. The optical assembly of claim 1, wherein:
   the first grating device is configured to receive a light beam from the fiber, the light beam including a plurality of optical signals with different spectral components; and
   the first grating device and the second grating device are configured such that after propagating through both the first grating device and the second grating device, the optical signals converge and are incident on the grating coupler with different input angles that respectively match optimal incidence angles configured for the different spectral components on the grating coupler.

5. An optical assembly comprising:
   a first grating device including a compensating grating with straight lines and equal line spacings and optically coupled to a fiber, the first grating device configured to:
      receive a light beam that includes an optical signal with a particular wavelength from the fiber; and
      change a propagation direction of the optical signal according to the particular wavelength of the optical signal; and
   a second grating device including a focusing grating with curved lines and unequal line spacings and positioned between the first grating device and a grating coupler, wherein the second grating device is positioned at an angle not parallel to the grating coupler, the second grating device configured to:
      receive the optical signal outputted from the first grating device;
      change the propagation direction of the optical signal according to the particular wavelength of the optical signal; and
      direct the optical signal onto the grating coupler,
   wherein the first grating device and the second grating device are configured to satisfy a plurality of configuration constraints that include:
      a relative displacement of the first grating device and the second grating device enables the second grating device to direct the optical signal onto the grating coupler; and
      after propagating through the second grating device, the optical signal is inputted to the grating coupler with an input angle that matches an optimal incidence angle configured for the particular wavelength on the grating coupler.

6. The optical assembly of claim 5, further comprising two focusing devices, including a first focusing device positioned in an optical path of the light beam between the fiber and the first grating device and a second focusing device positioned in the optical path of the light beam between the second grating device and the grating coupler.

7. The optical assembly of claim 5, wherein the second grating device provides both a dispersive function and a focusing function.

8. The optical assembly of claim 5, wherein the plurality of configuration constraints for the first grating device and the second grating device further includes at least one of:
   a spot size of the optical signal that converges on the grating coupler is within an acceptance spot size of the grating coupler; or
   a band of converging angles of the optical signal falls within a numerical aperture of the grating coupler.

9. The optical assembly of claim 5, wherein the first grating device includes a diffractive grating lens and the second grating device includes a diffractive grating lens.

10. The optical assembly of claim 5, wherein the fiber includes a single mode fiber.

11. The optical assembly of claim 5, wherein the grating coupler is configured to couple the optical signal with the input angle to a waveguide on a waveguide device and wherein the waveguide device comprises a silicon photonics device.

12. The optical assembly of claim 5, wherein the optical assembly further includes a mode transformation component configured to convert a Gaussian mode of the optical signal to an exponential mode.

13. The optical assembly of claim 12, wherein the mode transformation component includes a partial etch phase lens component.

14. An optical assembly comprising:
   a first grating device including a compensating grating with straight lines and equal line spacings and positioned proximate a fiber, the first grating device configured to:
      receive a light beam that includes optical signals with different wavelengths from the fiber; and
      change propagation directions of the optical signals according to the respective wavelengths of the optical signals; and
   a second grating device including a focusing grating with curved lines and unequal line spacings and positioned between the first grating device and a grating coupler, wherein the second grating device is positioned at an angle not parallel to the grating coupler, the second grating device configured to:
      receive the optical signals outputted from the first grating device;
      change the propagation directions of the optical signals according to the respective wavelengths of the optical signals; and
      direct the optical signals onto the grating coupler,
   wherein the first grating device and the second grating device are configured to satisfy a plurality of configuration constraints that include:
      a relative displacement of the first grating device and the second grating device enables the second grating device to direct the optical signals with the different wavelengths onto the grating coupler; and
      after propagating through the second grating device, the optical signals converge and are incident on the grating coupler with different input angles that respectively match optimal incidence angles configured for the different wavelengths on the grating coupler.

15. The optical assembly of claim 14, wherein the plurality of configuration constraints for the first grating device and the second grating device further includes:
   a spot size of each of the optical signals that converge on the grating coupler is within an acceptance spot size of the grating coupler; and
   a band of converging angles of each of the optical signals falls within a numerical aperture of the grating coupler.

16. The optical assembly of claim 14, wherein the first grating device includes a diffractive grating lens and the second grating device includes a diffractive grating lens.

17. The optical assembly of claim 14, wherein the fiber includes a single mode fiber.

18. The optical assembly of claim 14, wherein the optical assembly further includes a mode transformation component configured to convert a Gaussian mode of the optical signal to an exponential mode.

19. An optical system comprising:
   a fiber configured to output a light beam that includes an optical signal with a particular wavelength;
   an optical assembly that includes:
      a first grating device including a compensating grating with straight lines and equal line spacings and positioned proximate the fiber, the first grating device configured to receive the light beam from the fiber and change a propagation direction of the optical signal according to the particular wavelength of the optical signal; and
      a second grating device including a focusing grating with curved lines and unequal line spacings and positioned between the first grating device and a grating coupler, wherein the first grating device and the second grating device are parallel and have the same dispersive properties and the second grating device is positioned at an angle not parallel to the grating coupler, the second grating device configured to receive the optical signal outputted from the first grating device, change the propagation direction of the optical signal according to the particular wavelength of the optical signal, and direct the optical signal onto the grating coupler, wherein the first grating device and the second grating device are configured to satisfy a plurality of configuration constraints that include:
         a relative displacement of the first grating device and the second grating device enables the second grating device to direct the optical signal onto the grating coupler; and
         after propagating through the second grating device, the optical signal is inputted to the grating coupler with an input angle that matches an optimal incidence angle configured for the particular wavelength on the grating coupler; and
   wherein the grating coupler is configured to couple the optical signal with the input angle to a waveguide on a silicon photonics device.

* * * * *